US006364318B1

(12) United States Patent
Bedi et al.

(10) Patent No.: US 6,364,318 B1
(45) Date of Patent: Apr. 2, 2002

(54) DEVICE FOR HOLDING A TOOL BIT AND SELECTIVELY TRANSMITTING OR RELEASING TORQUE BETWEEN A TORQUE GENERATING MEANS AND THE TOOL BIT

(75) Inventors: Sanjeev Bedi, Waterloo; Maz A. Hasan, Kitchener, both of (CA)

(73) Assignee: Maxtech Manufacturing Inc., Waterloo (CA)

( * ) Notice: Subject to any disclaimer, the term of this patent is extended or adjusted under 35 U.S.C. 154(b) by 0 days.

(21) Appl. No.: 09/635,837

(22) Filed: Aug. 11, 2000

Related U.S. Application Data

(60) Provisional application No. 60/148,591, filed on Aug. 13, 1999.

(51) Int. Cl.[7] .............................................. B23B 31/10

(52) U.S. Cl. ............................ 279/22; 81/57.4; 279/82

(58) Field of Search ............................ 279/22, 30, 75, 279/82; 408/241 S, 202, 239 R; 81/57.24, 57.4

(56) References Cited

U.S. PATENT DOCUMENTS 3,091,473 A * 5/1963 Bilz ............................ 279/76
4,287,923 A * 9/1981 Hornung ...................... 81/429
4,491,444 A * 1/1985 Rumpp et al. .............. 409/134
4,736,658 A 4/1988 Jore
5,447,397 A * 9/1995 Asano ......................... 408/59
5,996,452 A * 12/1999 Chiang ........................ 81/429
6,199,872 B1 * 3/2001 Hasan ......................... 279/30

OTHER PUBLICATIONS

Copy of packing material from “Standard Dimpler 600”.

* cited by examiner

*Primary Examiner*—Daniel W. Howell
(74) *Attorney, Agent, or Firm*—R. Craig Armstrong

(57) ABSTRACT

A device for holding a tool bit and selectively transmitting or releasing torque between a torque generating means and the tool bit, comprises an elongate body having a tool bit holding means at one end and a torque input shaft at the other end, the torque input shaft shaped to be accepted by a drive means of the torque generating means whereby the body rotates about a longitudinal axis with rotation of the drive means of the torque generating means, a sleeve surrounding the tool bit holding means end of the body, the sleeve biased away from the torque input shaft end of the body by a biasing means and the sleeve slidably arranged between a first end position and a second end position, and a sleeve retaining means to prevent the sleeve from sliding past the first end position and the second end position.

5 Claims, 21 Drawing Sheets

DEVICE FOR HOLDING A TOOL BIT AND SELECTIVELY TRANSMITTING OR RELEASING TORQUE BETWEEN A TORQUE GENERATING MEANS AND THE TOOL BIT

REFERENCE TO RELATED APPLICATION

This is a formal application based on and claiming the benefit of U.S. provisional patent application No. 60/148,591, filed Aug. 13, 1999.

BACKGROUND OF THE INVENTION

This invention relates to a device for holding a tool bit and selectively transmitting or releasing torque between a torque generating means and the tool bit, especially for use in hand tools when driving screws, or the like, to a preset depth into a workpiece. The device is either used with a non-adjustable preset depth of torque release, or adjustable for any desired preset depth of torque release.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
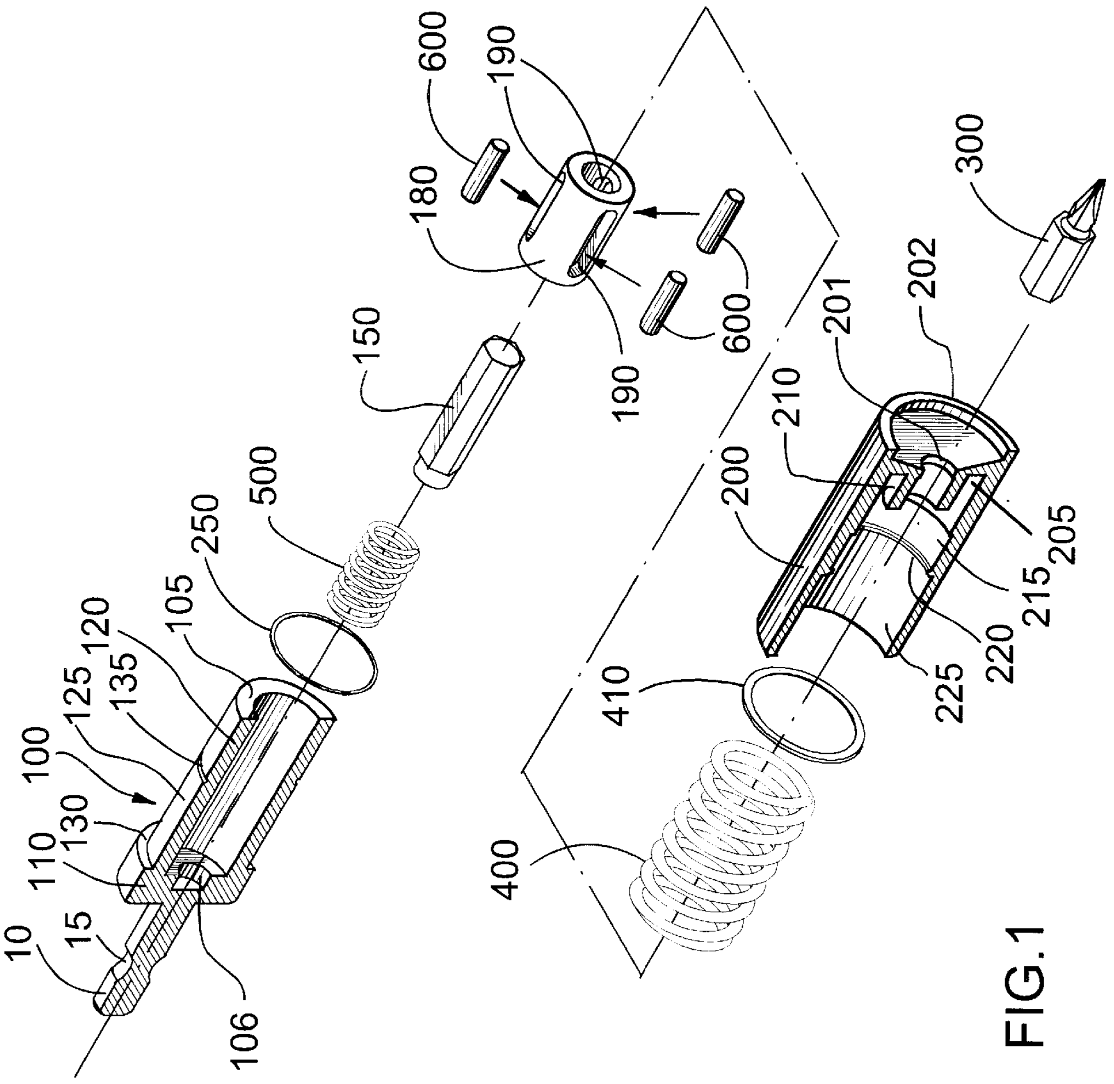
FIG. 1 is a partially sectioned exploded perspective side view of a device according to a first embodiment of the invention.

A first embodiment of a device for holding a tool bit 300 and selectively transmitting or releasing torque between a torque generating means (not shown) and the tool bit, is shown in FIGS. 1 to 9A. The device comprises an elongate body 100 having a first opening 105 at a first end 120 and a torque input shaft 10 at a second end 110. The first opening has a cross-section width which is larger than the cross-section Width of the tool bit, and is arranged to house a tool bit gripping means comprising a substantially tubular housing 180, which has a plurality of longitudinal slits 190 and one torque transfer means 600 arranged in each slit. Preferably, the number of longitudinal slits is two, three or six. The torque transfer means is preferably a substantially cylindrical pin having bevelled edges 610. The body 100 has a slide surface 125 arranged on its outside surface along a majority of the length of the body. A stop 130 is arranged at the second end 110, the function of this stop will be described later.

The torque input shaft is 10 shaped to be accepted by a drive means (not shown) of the torque generating means and secured by an input shaft gripping means (not shown) cooperating with a circumferential waist 15 of the torque input shaft. The body 100 is thus rotated about a longitudinal axis with rotation of the torque generating means. A sleeve 200 is movably,arranged to surround the body, and the sleeve is biased away from the torque input shaft end of the body by a first biasing means 400. The first biasing means is held between the stop 130 of the body 100 and the sleeve 200, pressing the sleeve away from the stop 130. A sleeve retaining means 250 is arranged in a circumferential groove 135 of the body 100 and cooperates with a first annular recess 215 on the inner surface of the sleeve 200, to prevent the sleeve from sliding past the first end position and the second end position. The sleeve is thus slidably arranged between a first end position and a second end position along the slide surface 125 of the body 100. The sleeve retaining means 250 is preferably a substantially round ring having a first end surface 251 and a second end surface 252, the two end surfaces arranged at a certain gap between each other, to facilitate the radial compression of the sleeve retaining means during assembly of the sleeve 200 onto the body 100. The cross-section of the sleeve retaining means 250 is preferably substantially circular. A front portion 202 of the sleeve is arranged to make contact with a working surface (not shown) into which a screw (not shown) is driven.

Figure 3A:
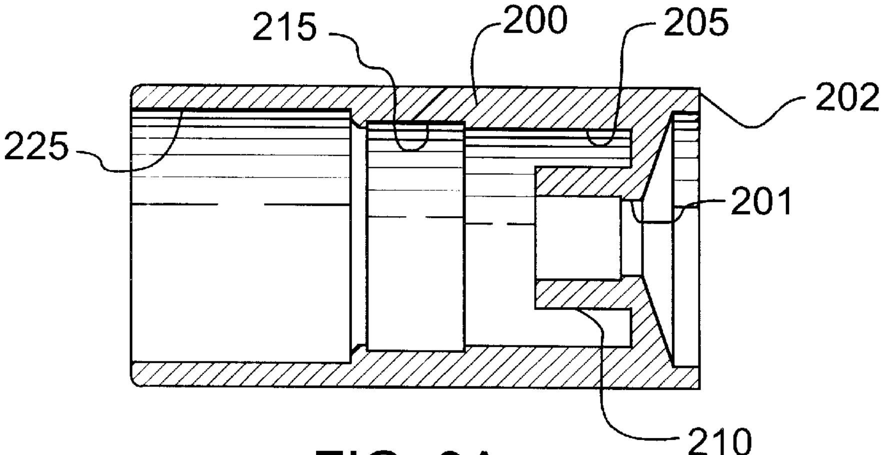
FIG. 3A is a sectional side view of a sleeve according to the first embodiment of the invention.
Figure 3B:
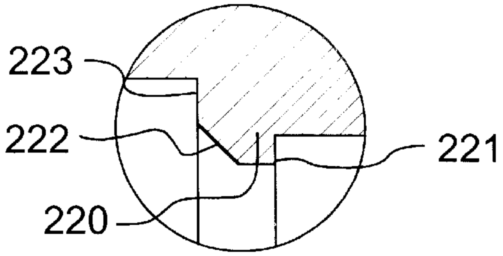
FIG. 3B is a sectional side view of the detail "A" according to FIG. 3A.
Figure 4A:
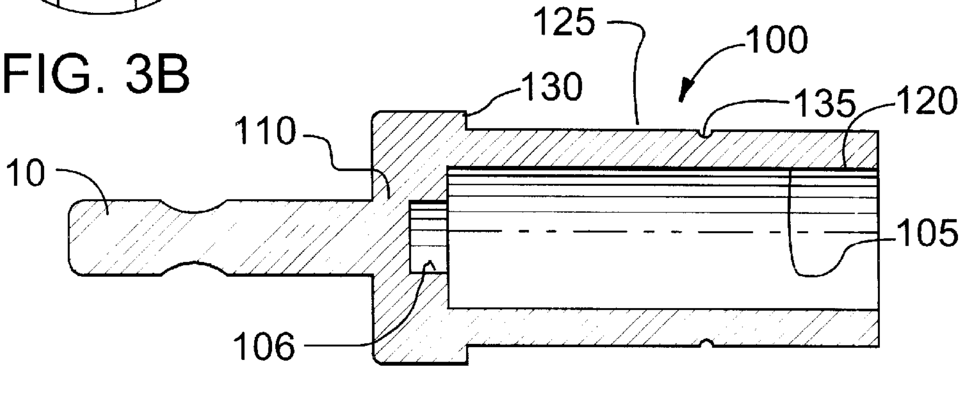
FIG. 4A is a sectional side view of a body according to the first embodiment of the invention.
Figure 4B:
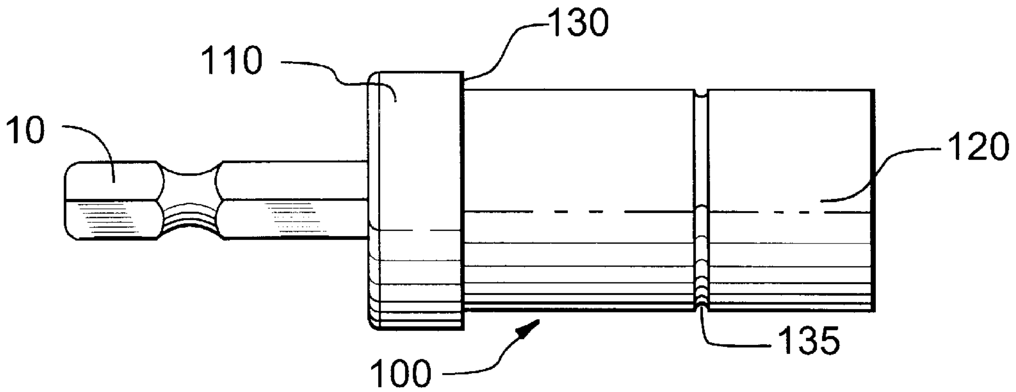
FIG. 4B is a side view of a body according to the first embodiment of the invention.
Figure 6B:
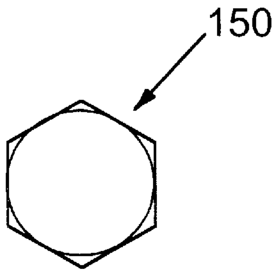
FIG. 6B is a frontal view of a distance piece according to the first embodiment of the invention, as seen from its hexagonal shape end.
Figure 5A:
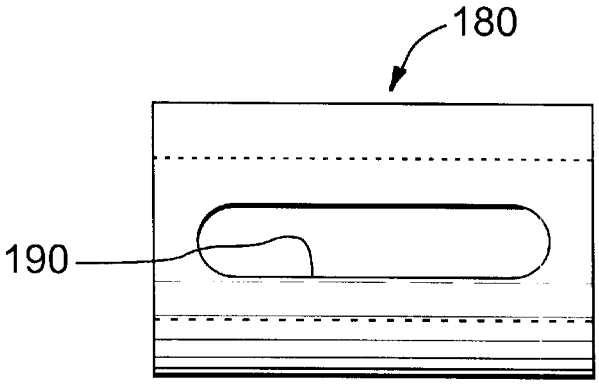
FIG. 5A is a side view of a roll holder according to the first embodiment of the invention.
Figure 6A:
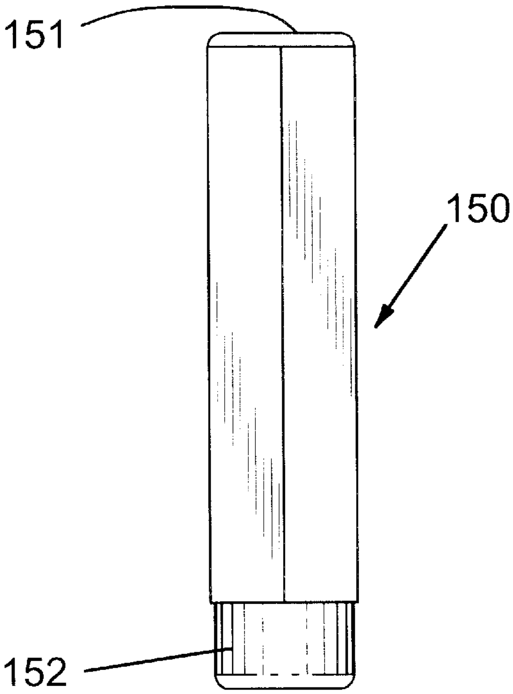
FIG. 6A is a side view of a distance piece according to the first embodiment of the invention.
Figure 5B:
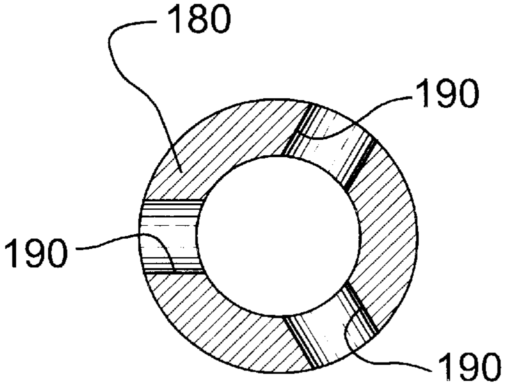
FIG. 5B is a frontal view of a roll holder according to the first embodiment of the invention.
Figure 6C:
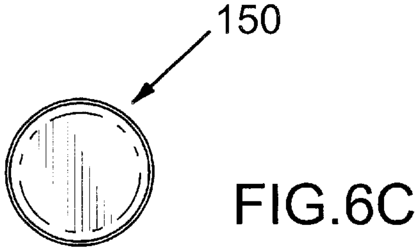
FIG. 6C is a frontal view of a distance piece according to the first embodiment of the invention, as seen from its round shape end.
Figure 7B:
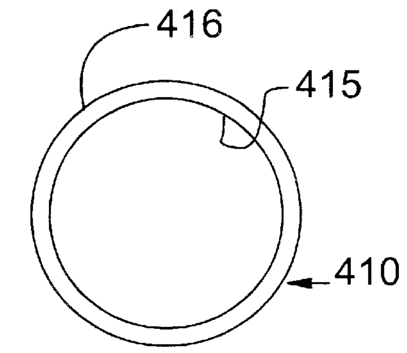
FIG. 7B is a view from above of a biasing means support means according to the first embodiment of the invention.
Figure 8B:
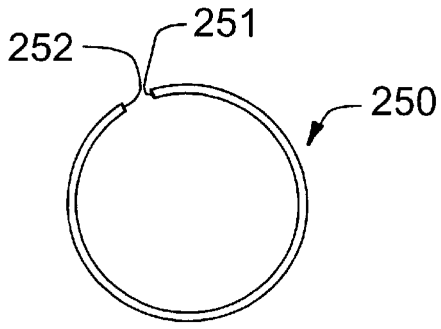
FIG. 8B is a view from above of a sleeve retaining means according to the first embodiment of the invention.
Figure 7A:
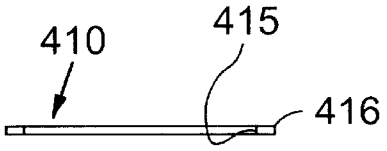
FIG. 7A is a side view of a biasing means support means according to the first embodiment of the invention.
Figure 8A:
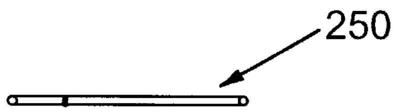
FIG. 8A is a side view of a sleeve retaining means according to the first embodiment of the invention.
Figure 9B:
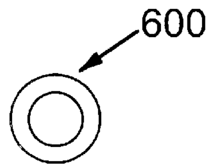
FIG. 9B is a frontal view of a torque transfer means according to the first embodiment of the invention.
Figure 9A:
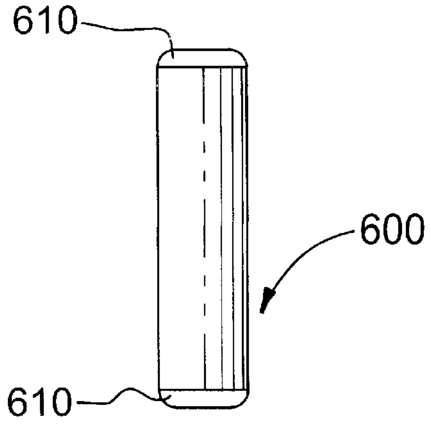
FIG. 9A is a side view of a torque transfer means according to the first embodiment of the invention.
Figure 10:
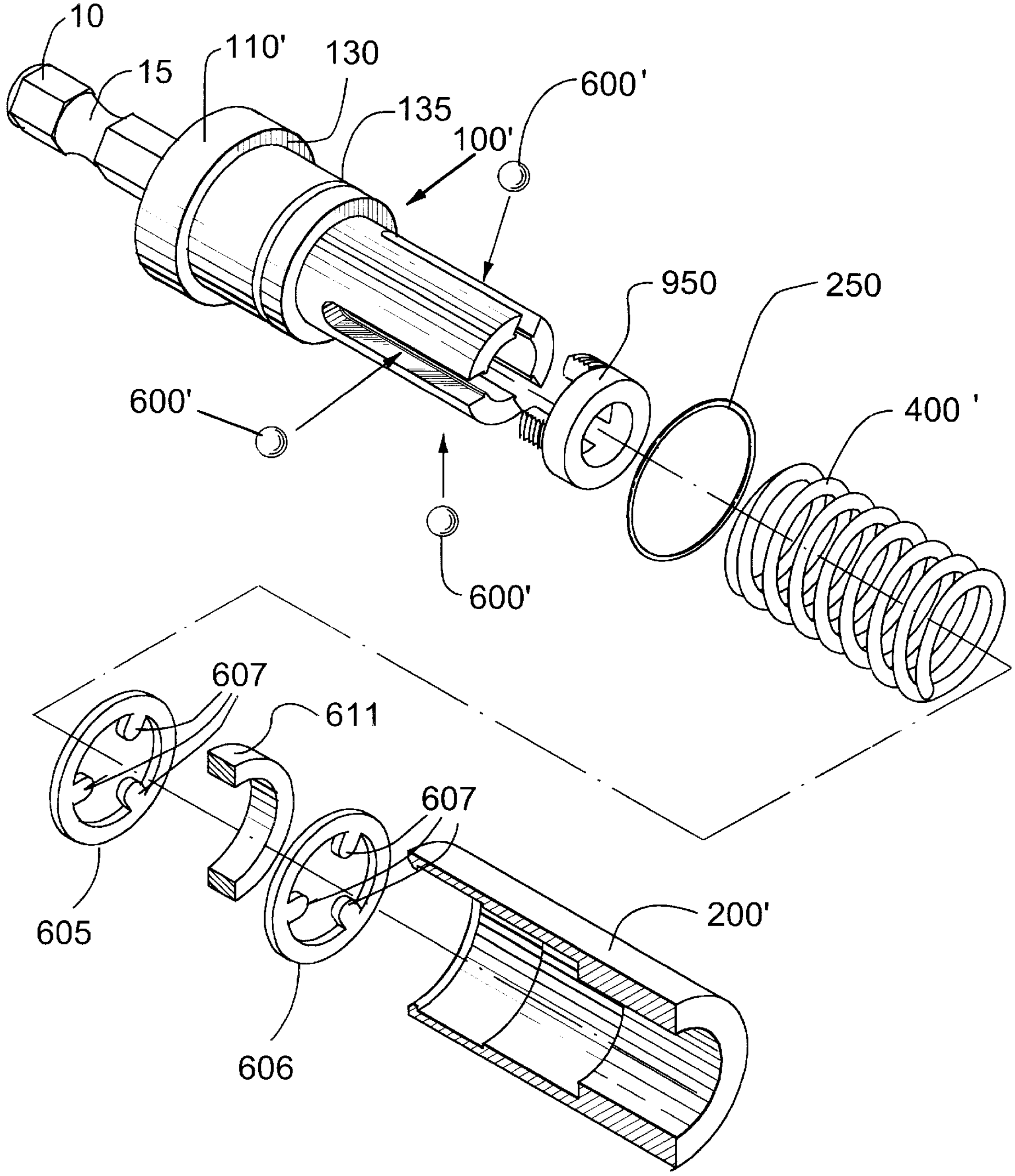
FIG. 10 is a partially sectioned exploded perspective side view of a device according to a second embodiment of the invention.
Figure 11A:
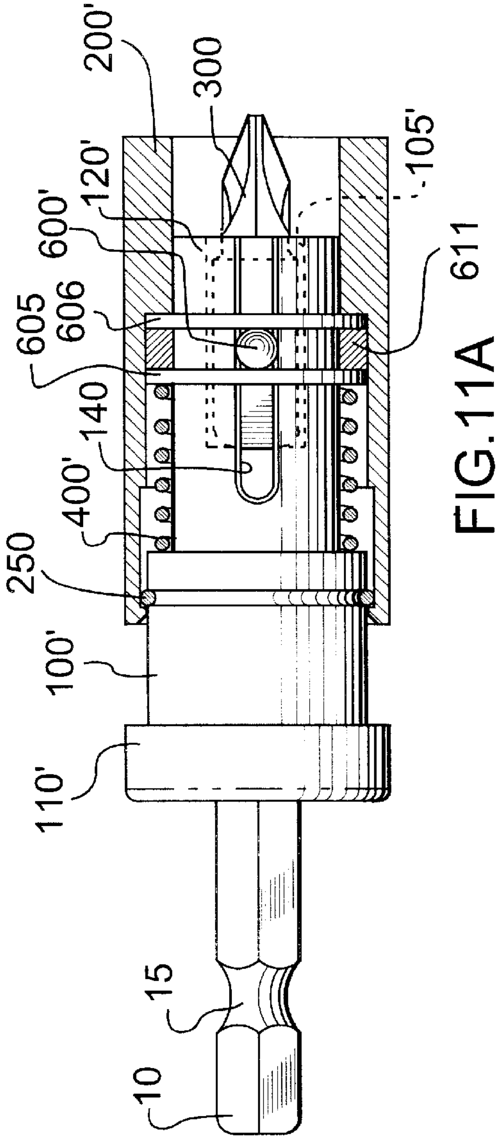
FIG. 11A is a sectional side view of a device according to the second embodiment of the invention, showing the device with the sleeve in its extended position, i.e. during torque transfer or non-use of the device.
Figure 11B:
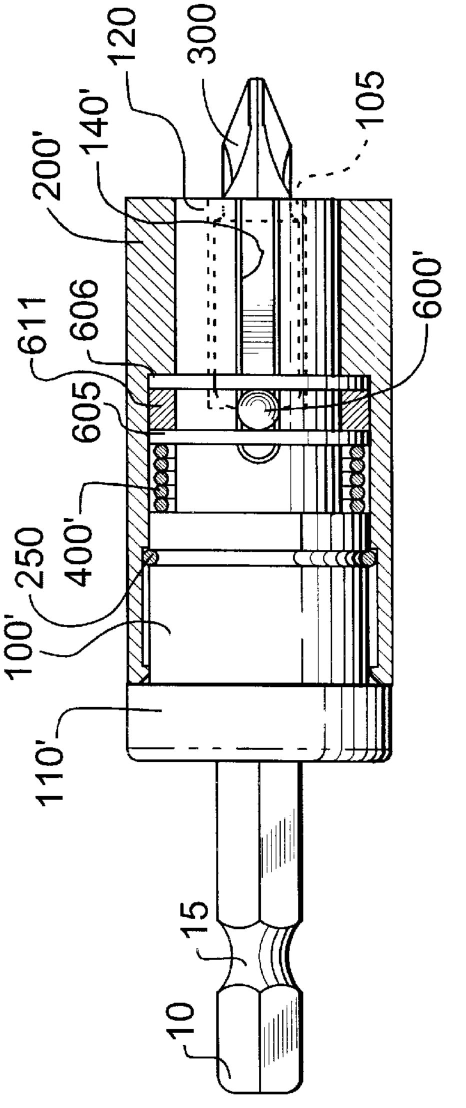
FIG. 11B is a sectional side view of the device according to the second embodiment of the invention, showing the device with the sleeve in its retracted position, i.e. during interruption of torque transfer at a preset depth of driving a screw.
Figure 12:
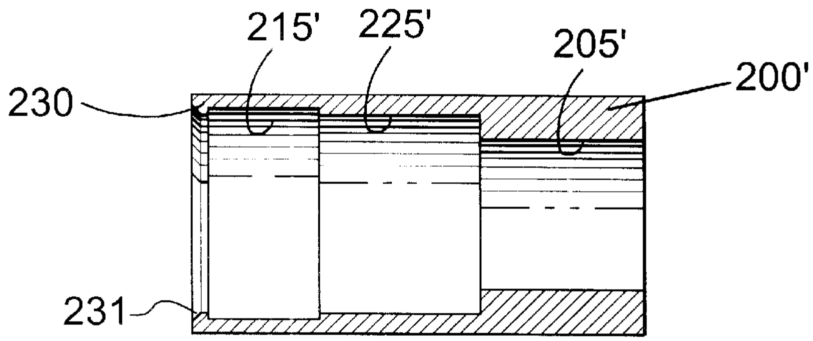
FIG. 12 is a sectional side view of a sleeve according to the second embodiment of the invention.
Figure 13A:
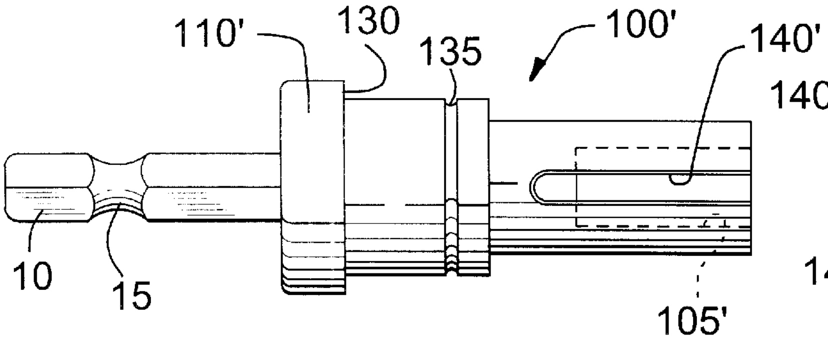
FIG. 13A is a side view of a body according to the second embodiment of the invention.
Figure 13B:
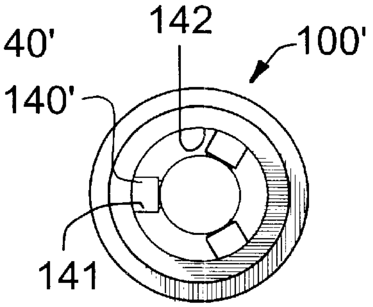
FIG. 13B is a frontal view of a body according to the second embodiment of the invention, seen from the tool bit side.
Figure 14A:
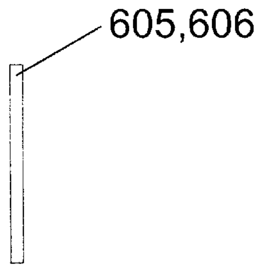
FIG. 14A is a side view of a washer according to the second embodiment of the invention.
Figure 14B:
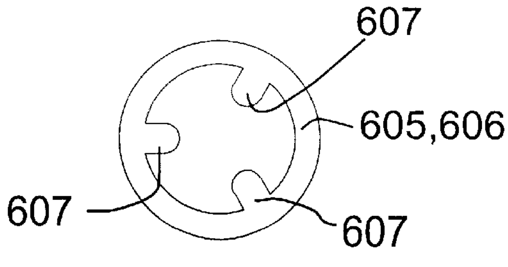
FIG. 14B is a view from above of a washer according to the second embodiment of the invention.
Figure 15A:
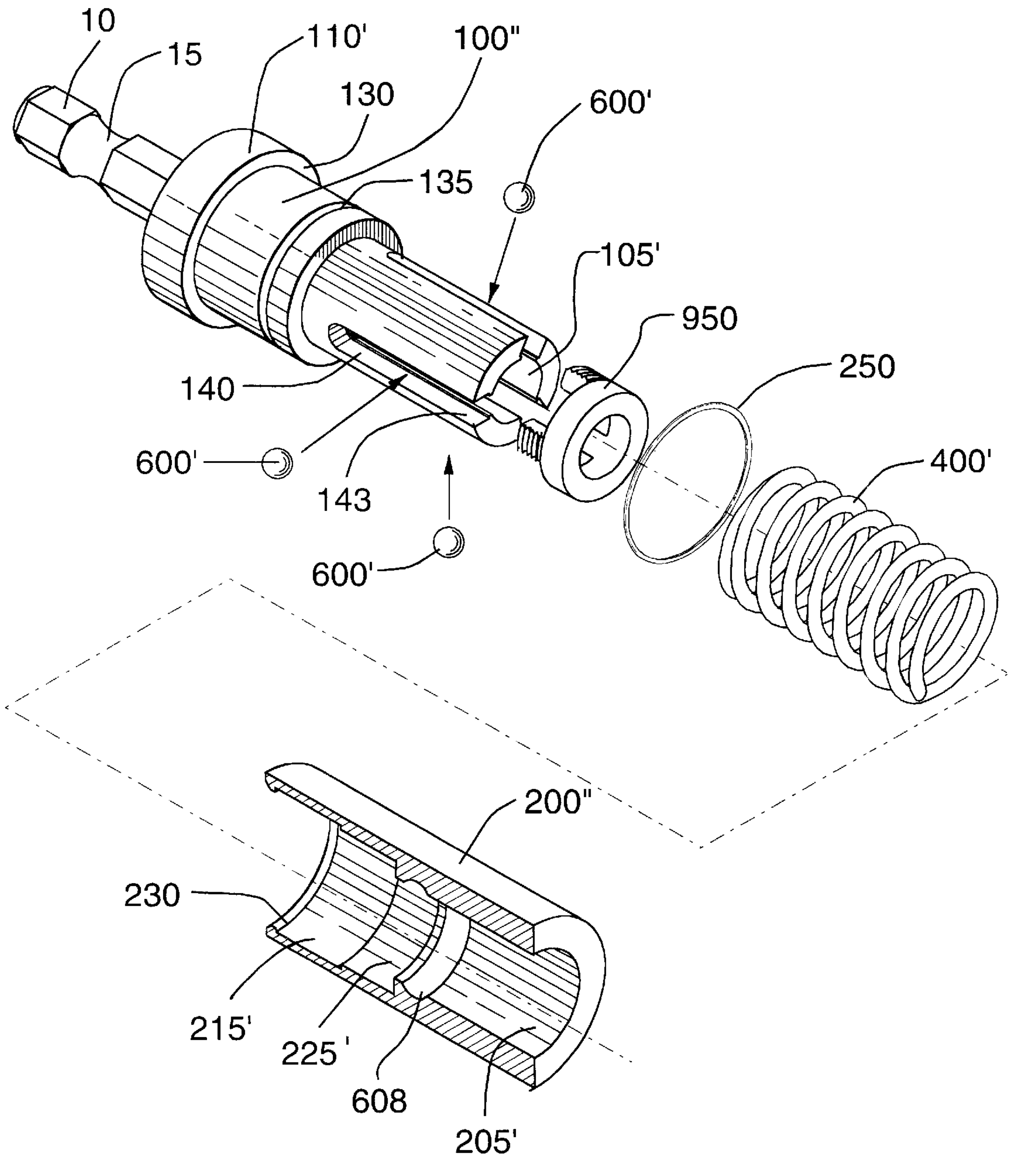
FIG. 15A is a partially sectioned exploded perspective side view of a device according to a third embodiment of the invention.
Figure 15B:
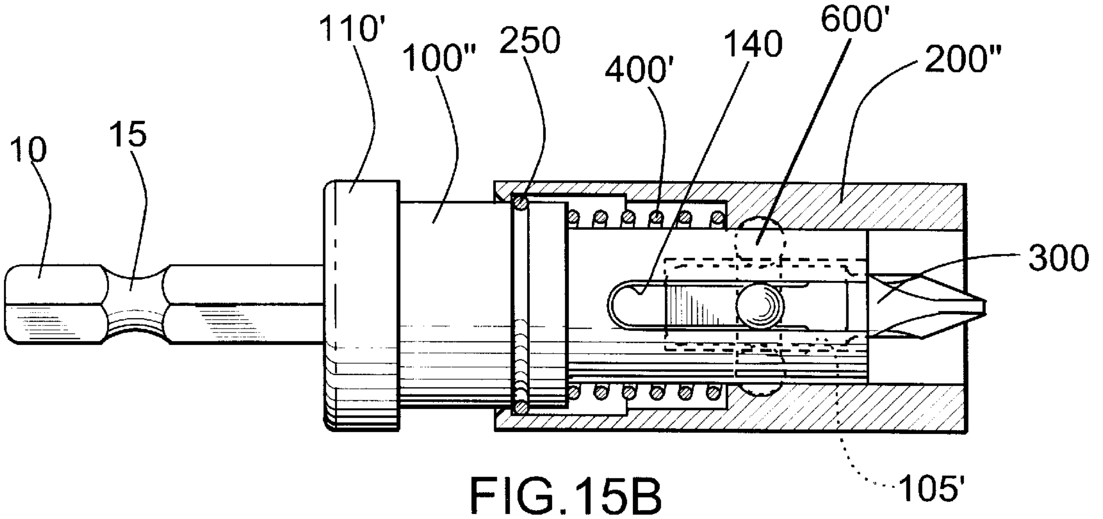
FIG. 15B is a sectional side view of a device according to the third embodiment of the invention, showing the device with the sleeve in its extended position, i.e. during torque transfer or non-use of the device.
Figure 15C:
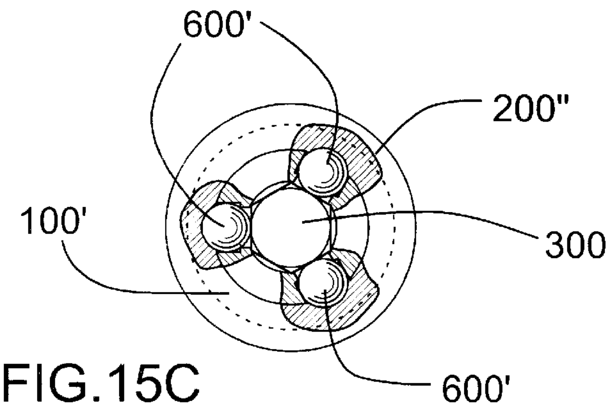
FIG. 15C is a frontal view of a device according to the third embodiment of the invention.
Figure 16:
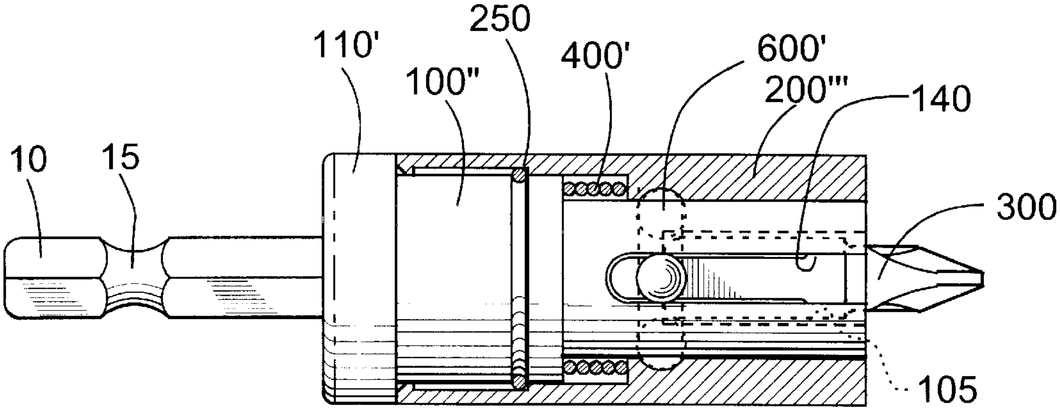
FIG. 16 is a sectional side view of the device according to the third embodiment of the invention, showing the device with the sleeve in its retracted position, i.e. during interruption of torque transfer at a preset depth of driving a screw.
Figure 17:
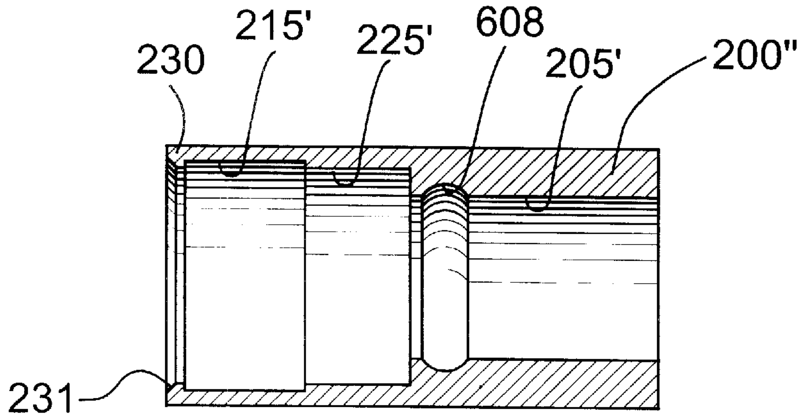
FIG. 17 is a sectional side view of a sleeve according to the third embodiment of the invention.
Figure 18A:
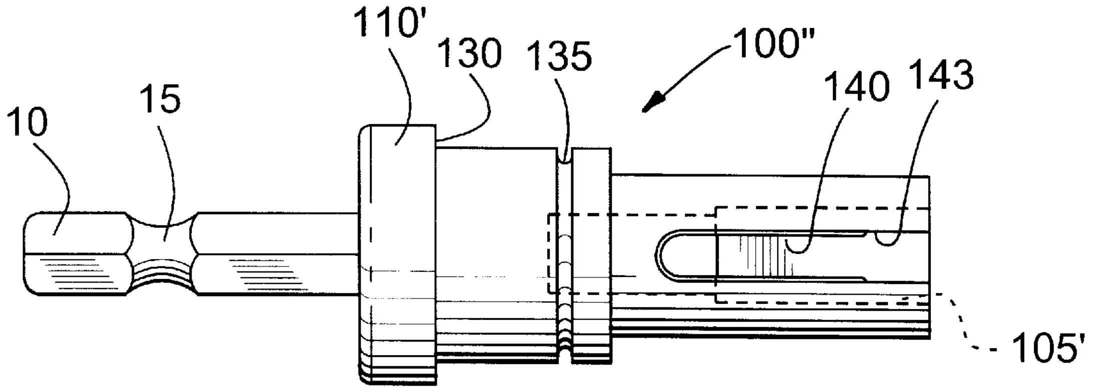
FIG. 18A is a side view of a body according to the third embodiment of the invention.
Figure 18B:
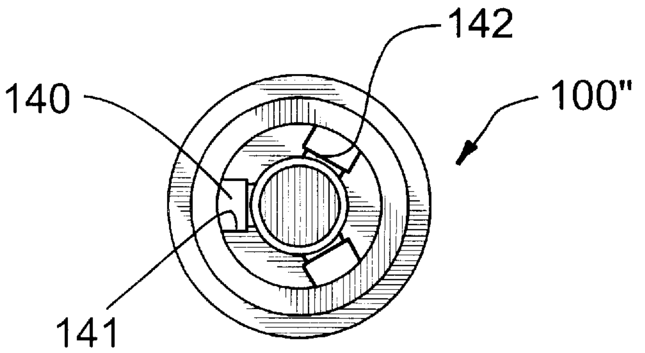
FIG. 18B is a frontal view of a body according to the third embodiment of the invention.
Figure 19A:
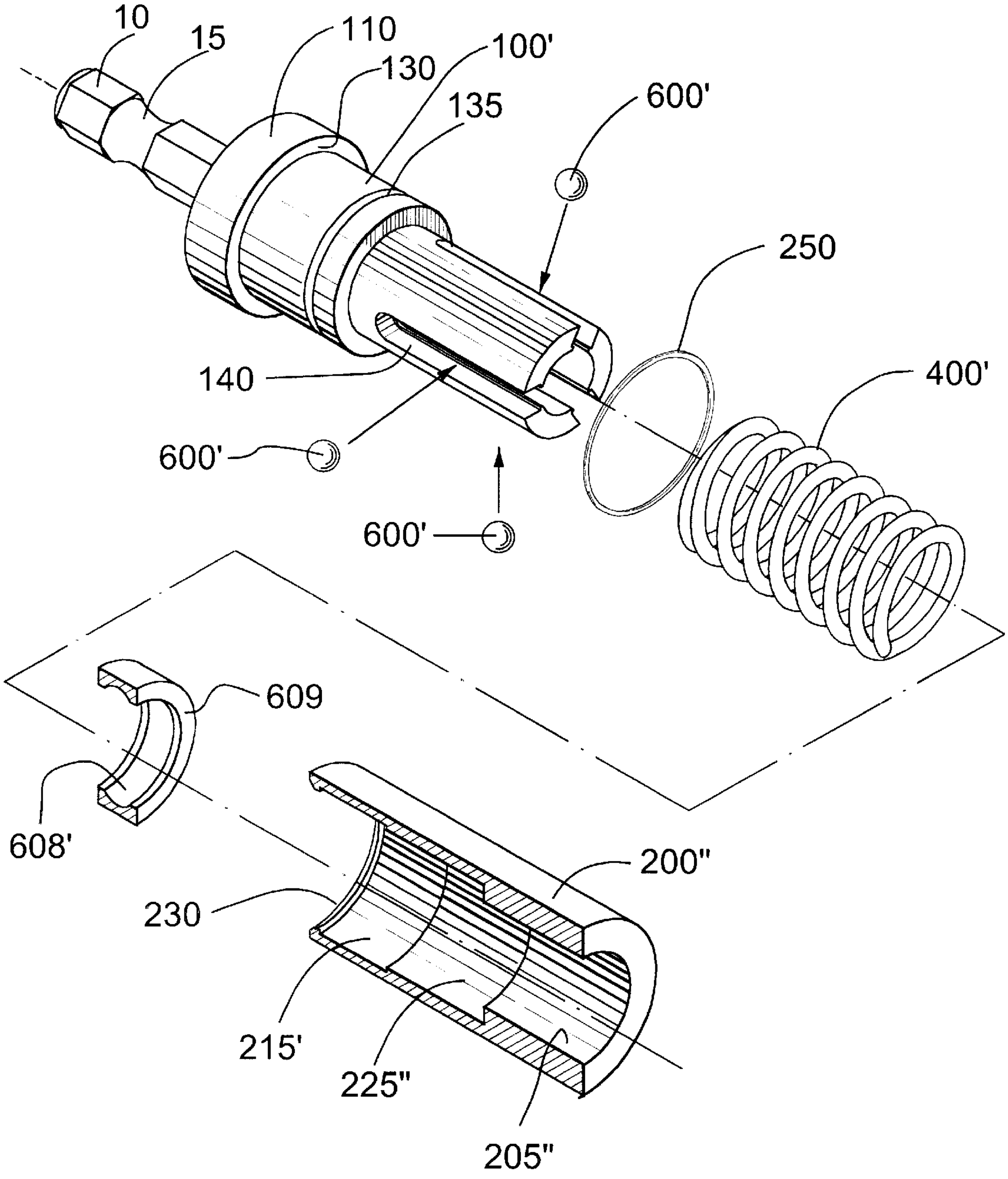
FIG. 19A is a partially sectioned exploded perspective side view of a device according to a fourth embodiment of the invention.
Figure 19B:
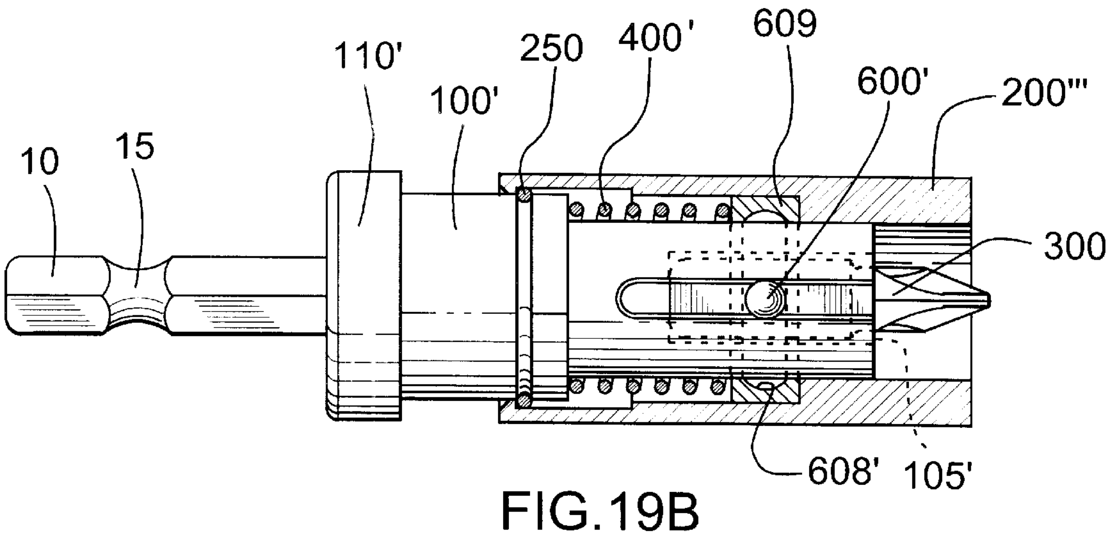
FIG. 19B is a sectional side view of a device according to the fourth embodiment of the invention, showing the device with the sleeve in its extended position, i.e. during torque transfer or non-use of the device.
Figure 20:
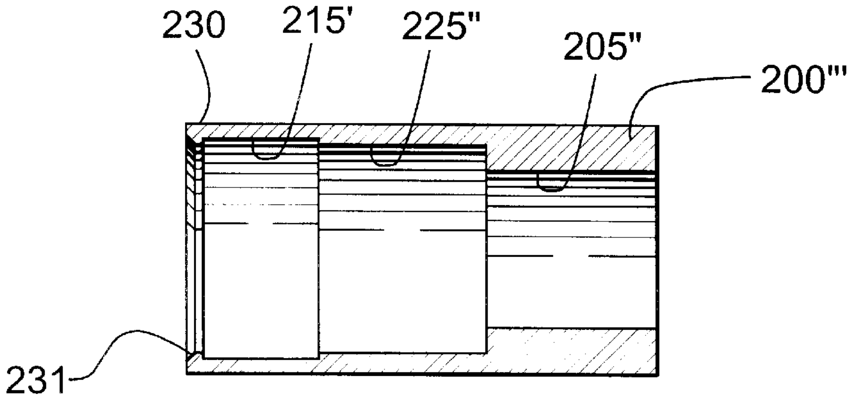
FIG. 20 is a sectional side view of a sleeve according to the fourth embodiment of the invention.
Figure 21A:
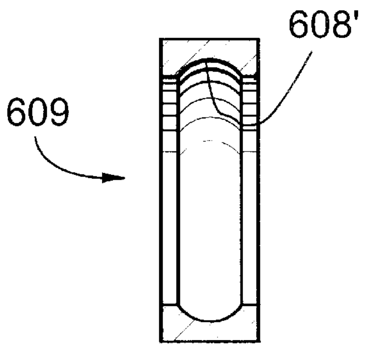
FIG. 21A is a sectional side view of a bearing race insert according to the fourth embodiment of the invention.
Figure 21B:
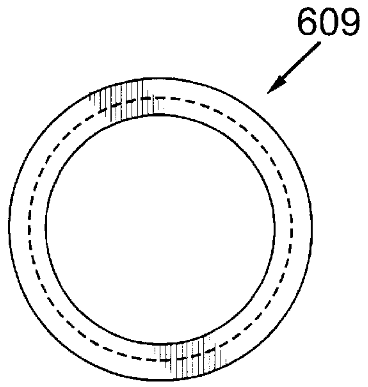
FIG. 21B is a view from above of a bearing race insert according to the fourth embodiment of the invention.
Figure 22A:
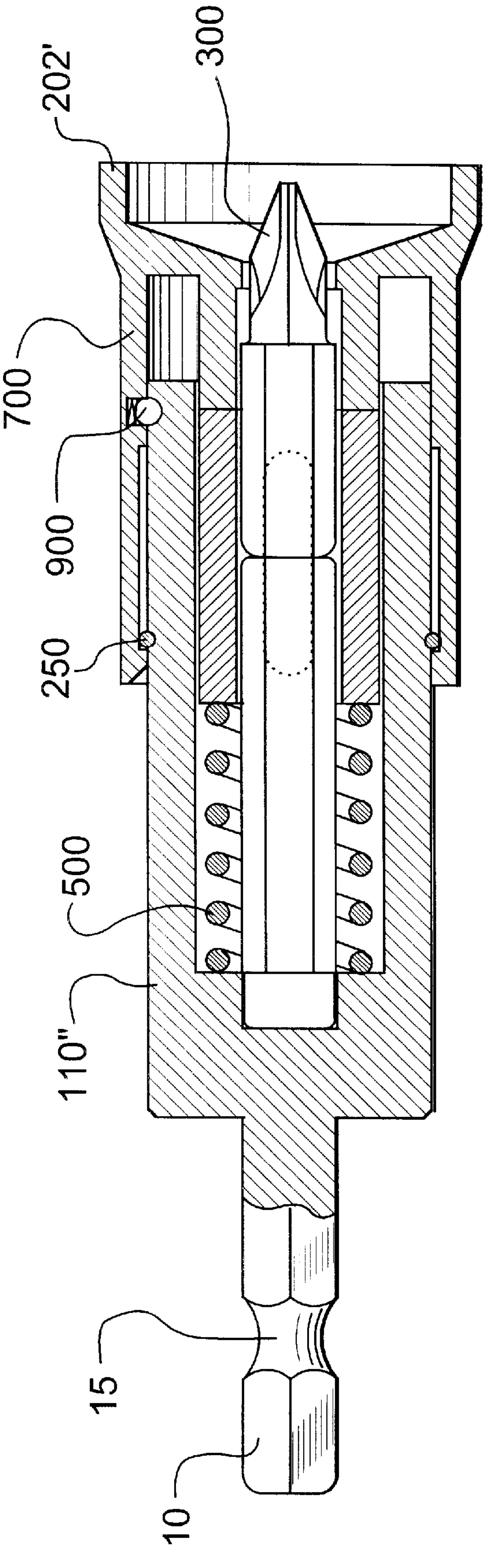
FIG. 22A is a sectional side view of a device according to a fifth embodiment of the invention.
Figure 22B:
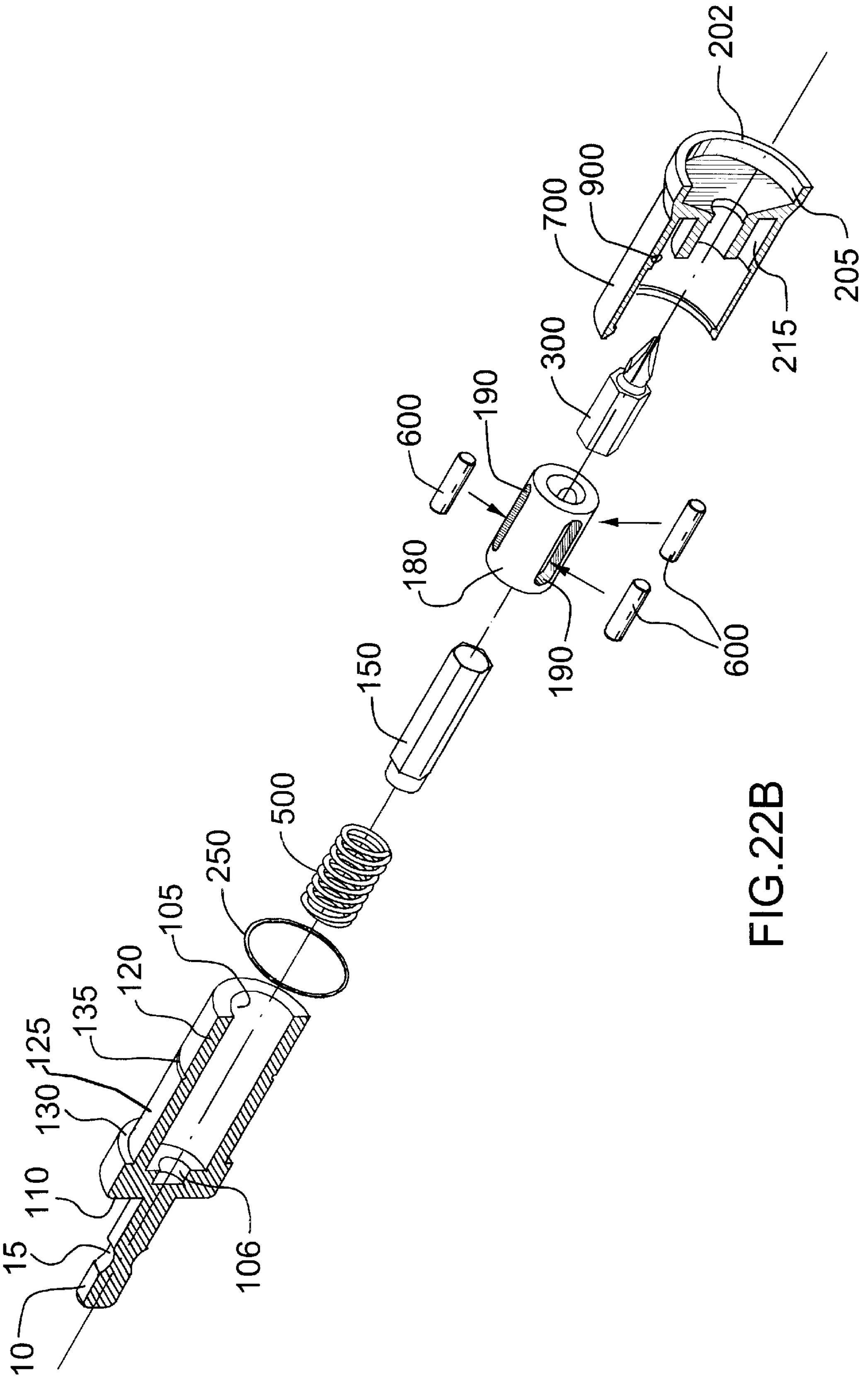
FIG. 22B is an exploded partly sectional perspective view of a device according to the fifth embodiment of the invention.
Figure 22C:
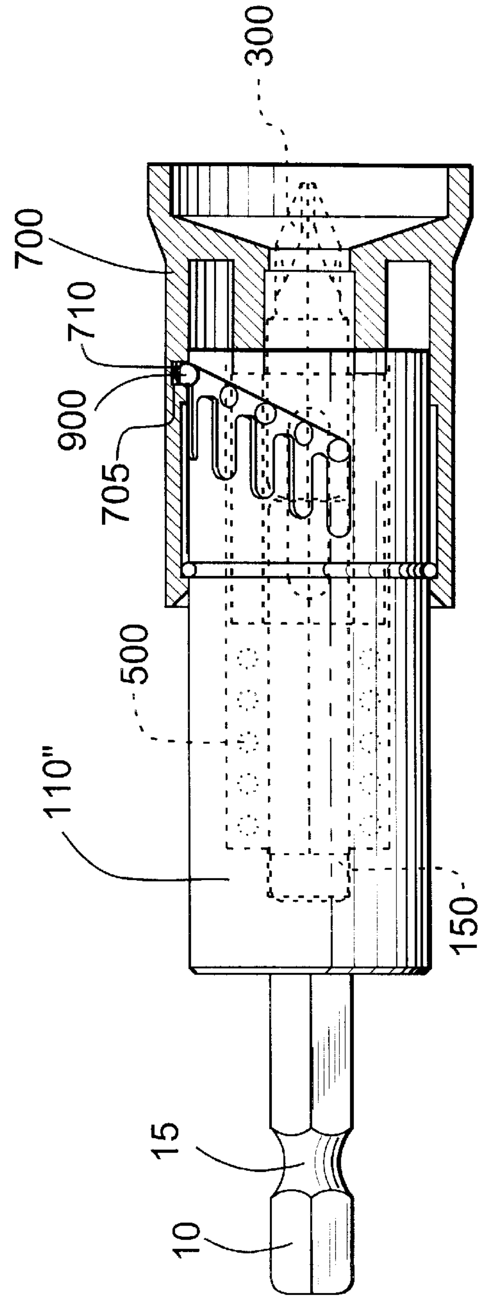
FIG. 22C is a partly sectional side view of a device according to the fifth embodiment of the invention, showing the sleeve in a first driving depth setting.
Figure 23B:
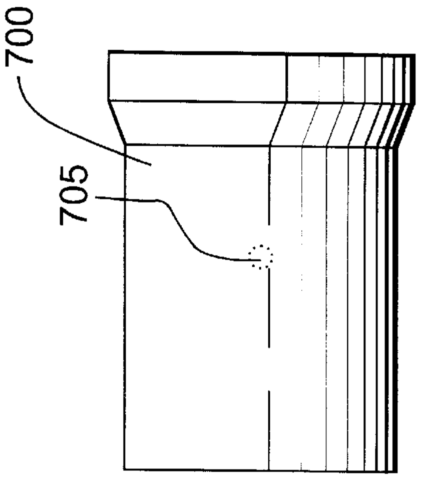
FIG. 23B is a side view of a sleeve according to the fifth embodiment of the invention.
Figure 23A:
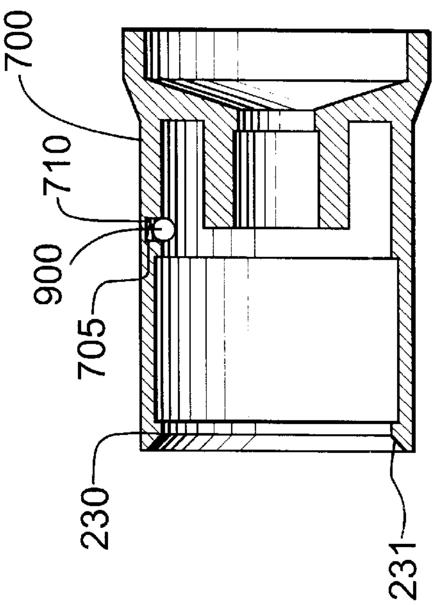
FIG. 23A is a sectional side view of a sleeve according to the fifth embodiment of the invention.

Further, the sleeve 200 has a second annular recess 225 arranged at the torque input shaft end, to cover the first biasing means 400 and to provide a working space for the sleeve biasing means. As shown in FIGS. 3A and 3B, a protrusion 220, is arranged between the first annular recess 215 and the second annular recess 225, to provide a first stop surface 221 facing the tool bit, to act as a stop for the sleeve retaining means 250 at the second end position of the sleeve 200, and a second stop surface 223 facing the first biasing means 400, to act as a force transmitting surface between the sleeve biasing means and the sleeve. Preferably, the protrusion 220 has a bevelled surface 222 facing the sleeve biasing means, to facilitate the compression of the sleeve retaining means 250 during assembly of the sleeve 200 onto the body 100. To provide a large enough force transmitting surface for the first biasing means 400, a substantially flat annular thrust ring 410 is arranged between the first biasing means and the second stop surface 223. The thrust ring has an outer diameter 416, which is slightly smaller than the inside diameter of the second annular recess 225, and an inner diameter 415, which is slightly larger than the diameter of the slide surface 125 of the body 100. The sleeve further has a tool bit receiving hole 201, having a cross-section slightly larger than the largest cross-section of the tool-bit. The shape of the tool bit receiving hole corresponds to the shape of the inserted end of the tool bit. The sleeve 200 preferably has a funnel-shaped lead-in cooperating with the tool bit receiving hole, to facilitate the mounting of a tool bit into the device. The tool bit receiving hole 201 further cooperates with an elongate, substantially cylindrical tool bit shielding part 210 of the sleeve 200. The tool bit shielding part prevents the front part of the tool bit 300 from tilting during use of the device. A body recess 205 in the sleeve 200 allows the sleeve to slide on the body without restrictions other than those imposed by the sleeve retaining means 250. The body 100 will have to have a certain length to laterally securely hold the tool bit gripping means housing 180 in the position where the tool bit gripping means housing is in its position of being furthest away from the torque transfer mount 10, and this length of the body necessitates the body recess 205 in the sleeve 200.

The tool bit gripping means housing 180 is biased towards the tool bit by a second biasing means 500. A distance piece 150 is arranged in a distance holding hole 106 of the body 100, to provide a bottom surface 151 on which the tool bit is securely held in the longitudinal direction when inserted into the device. The distance piece preferably has a substantially round end 152, which cooperates with the distance holding hole 106 of the body 100. The distance piece 150 could possibly be an integral part of the body 100, but this design poses large problems during the manufacturing of such a piece.

Figure 2A:
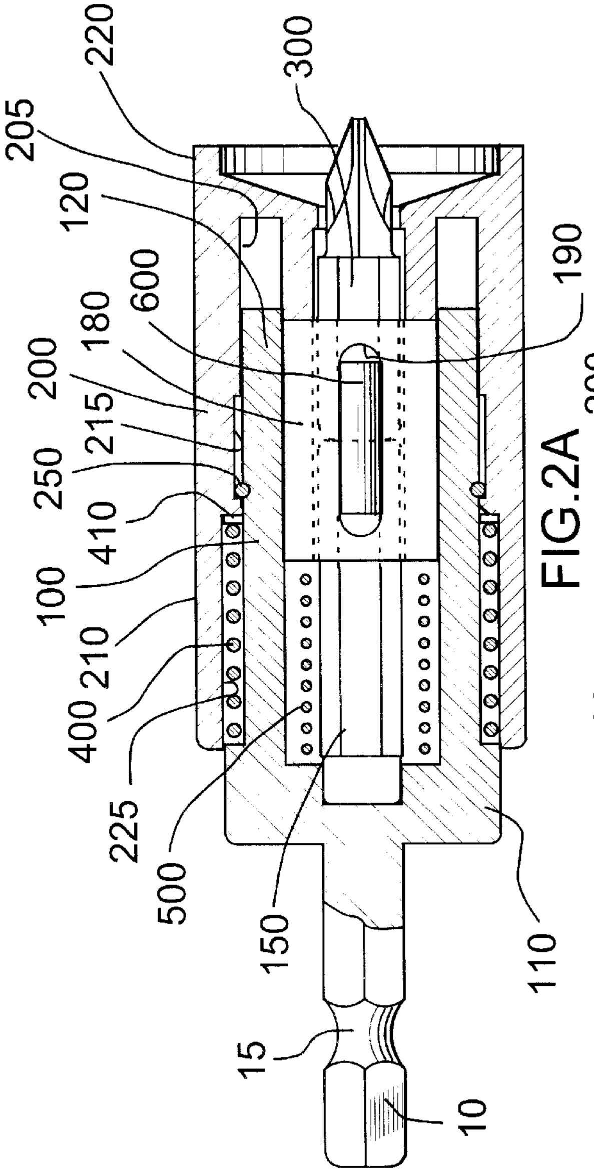
FIG. 2A is a sectional side view of a device according to the first embodiment of the invention, showing the device with the sleeve in its extended position, i.e. during torque transfer or non-use of the device.
Figure 2B:
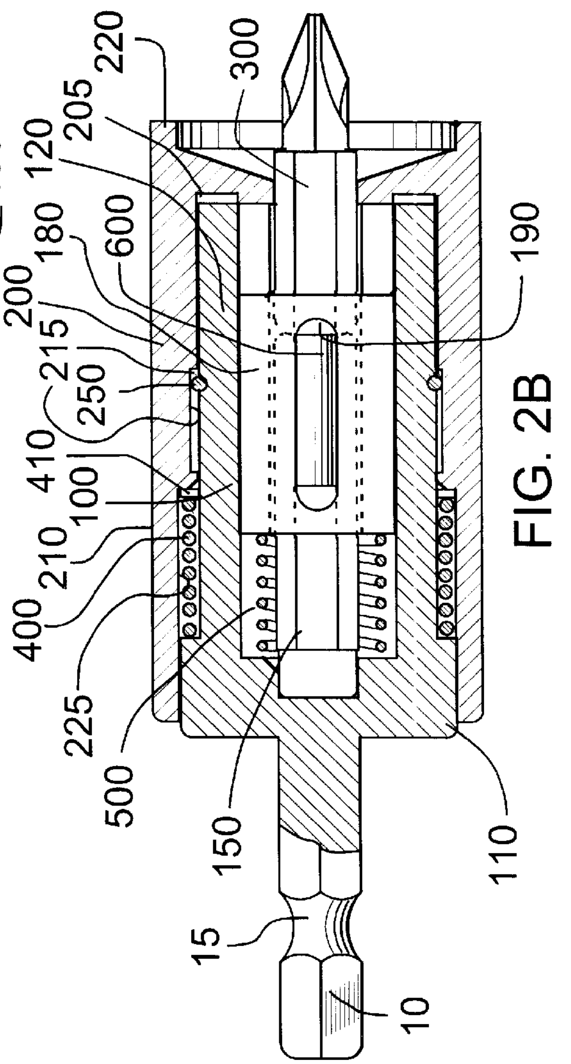
FIG. 2B is a sectional side view of a device according to the first embodiment of the invention, showing the device with the sleeve in its retracted position, i.e. during interruption of torque transfer at a preset depth of driving a screw.

The device according to the first embodiment of the invention operates as follows: when a tool bit 300 is inserted into the tool bit receiving hole 201 of the sleeve, as is shown in FIG. 2A, it is held by the torque transfer means 600 of the slits 190 of the tool bit gripping means housing 180, so that the tool bit is rotated when the device is rotated via the torque input means 10. The tool bit gripping means housing is in its position fully biased towards the tool bit. The sleeve 200 is also in its first position, fully biased towards the tool bit 300. When the screw is driven into the surface, the front portion 202 of the sleeve will eventually make contact with the surface at a preset screw-in depth of the screw. During continued driving of the screw, the sleeve will be pushed back towards the torque transfer mount 10, relative to the body 100. The torque transfer means 600 of the slits 190 of the tool bit gripping means housing 180 will loose their contact with the tool bit, as shown in FIG. 2B, and the torque transfer will be interrupted. The tool bit 300 thus stops driving the screw into the work surface at a preset depth of driving the screw.

In FIGS. 10 to 14B, a second embodiment of a device according to the invention is shown. Technical features that are similar to those of the first embodiment have been referenced with the same numerals. The device comprises an elongate body 100' having a second opening 105' at a first end 120' of the body and a torque input shaft 10 at a second end 110' of the body. The second opening has a cross-section width which is somewhat larger than the cross-section width of the tool bit, to allow insertion of the tool bit into the second opening. The cross-section shape of the second opening 105' thus corresponds to the cross-section shape of the mounting end of the tool bit. The body 100' further has two or more longitudinal channels 140' stretching from the first end 120' of the body towards the second end 110' of the body. The channels open a hole from the outside of the body 100' to the inside of the body where the second opening 105' is, but the channels run further along the body than the second opening does, the reason for this will be explained later. The channels 140' further have a first width 141 radially towards the outside of the body, and a second width 142 towards the inside of the body. The first width is larger than the second width. Advantageously, as shown in FIG. 10 and FIGS. 30 to 32, a dust cap 950 is inserted into the channels 140 when assembling the device. The dust cap has a number of wings 951, corresponding to the number of channels. The wings fit into the channels and a substantially ring-shaped dust cover body 952 abuts the end of the body 100", when the dust cover is inserted fully into the channels. A central dust cover opening 954 allows access into the holder for a tool bit. Advantageously, the wings 951 have substantially triangular flanges 953 arranged to enhance the grip of the wings in the channels, to prevent the dust cover 950 from dislodging from the body 100" during use of the holder. When the dust cap is used, the body 100" may be pressure cast and the ball restraints may be omitted, the dust cap will hold the balls in the channels to prevent the balls from falling out of the device during use.

The housing can be made using a pressure die-cast method that includes the use of slides to form the slits. This precludes the need for expensive machining and the slits need not extend to the end of the housing (creating openings at the end that necessitate the employment of a dust-cap). The slits can be cast with the correct profile and do not require subsequent operations.

The housing itself can be fabricated from a reinforced plastic material that is very similar to the die-cast method. Again, the slits are formed with the correct geometry and require no other operations. The torque input shaft can then be pressed into the drive-means end to complete the subassembly. If additional wear-resistance is needed, a metal sleeve can be inserted into the bore of the housing that will a) hold the screwdriver bits and b) prevent the steel balls from falling into the bore of the housing.

A sleeve 200' is movably arranged to surround the body, and the sleeve is biased away from the torque input shaft 10 by a third biasing means 400'. The third biasing means is held between the stop 130 of the body and the sleeve 200', pressing the sleeve away from the stop 130. The sleeve 200' has three inner diameter portions, with steps between the individual portions. A first inner diameter portion 205', arranged adjacent the first end 120' of the body, has an inner diameter slightly larger than the outside diameter of the first end 120' of the body, to slidably hold the sleeve 200' relative to the body 100'. A second inner diameter portion 225' is arranged following the first inner diameter portion. The second inner diameter portion 225' has a diameter slightly larger than the cross-section of the third biasing means 400'. A third inner diameter portion 215' is arranged following the second inner diameter portion 225'. A sleeve retaining means 250 is arranged in a circumferential groove 135, similar to the first embodiment, cooperating with the third inner diameter portion and an end stop 230, arranged at the end of the body which is opposite to the first inner diameter portion 205', so that the sleeve retaining means 250 allows the sleeve 200' to slide between two end positions. The third inner diameter portion 215' has an inner diameter slightly larger than the outside dimension of the sleeve retaining means in assembled state. Torque transfer means 600' are arranged to reciprocally slide in the channels 140', one torque transfer means in each channel. The torque transfer means are preferably substantially spherical balls for this embodiment. A first washer 605 and a second washer 606 are arranged one on each side of the torque transfer means 600'. The first and second washers are of identical shape, preferably a flat ring having two or more inwardly directed tongues 607. There is one tongue for each channel 140', and each tongue has a shape corresponding to the bottom of the channel, for example hemispherical, so that the washers are able to reciprocally slide together with the torque transfer means 600' in the channels. Between the two washers 605, 606, respectively, is a distance ring 611 arranged, to keep a set minimum distance between the washers at all times. The end stop 230 is preferably bevelled on the side of the sleeve 200', which faces away from the third inner diameter portion 215', to facilitate sliding of the sleeve over the sleeve retaining means 250 during the assembly of the sleeve onto the body.

A third embodiment of the invention is shown in FIGS. 15A to 18B. This embodiment shares a majority of technical features with the second embodiment, but has a different solution regarding how the torque transfer means 600' are held in the channels 140. All technical features that are the same as for the second embodiment are referenced with the same numerals in the Figs. The device comprises an elongate body 100" having a second opening 105' at a first end 120' of the body and a torque input shaft 10 at a second end 110' of the body. The second opening has a cross-section width which is somewhat larger than the cross-section width of the tool bit, to allow insertion of the tool bit into the second opening. The cross-section shape of the second opening 105' thus corresponds to the cross-section shape of the mounting end of the tool bit. The body 100" further has two or more longitudinal channels 140 stretching from the first end 120' of the body towards the second end 110' of the body. The channels open a hole from the outside of the body 100" to the inside of the body where the second opening 105' is, but the channels run further along the body than the second opening does, the reason for this will be explained later. The channels 140 further have a first width 141 radially towards the outside of the body, and a second width 142 towards the inside of the body. The first width is larger than the second width. The dust cap described for the second embodiment of the invention is useful also for the third embodiment.

A sleeve 200'", similar to the sleeve of the second embodiment, being movably arranged to surround the body 100'. The sleeve is biased away from the torque input shaft 10 by the third biasing means 400'. The third biasing means is held between the stop 130 of the body 100" and the sleeve 200'", pressing the sleeve away from the stop 130. The sleeve 200'" has three inner diameter portions, with steps between the individual portions. The first inner diameter portion 205', is arranged adjacent the first end 120' of the body, and has an inner diameter slightly larger than the outside diameter of the first end 120' of the body, to slidably hold the sleeve 200'" relative to the body 100". The second inner diameter portion 225' is arranged following the first inner diameter portion. The second inner diameter portion 225' has a diameter slightly larger than the cross-section of the third biasing means 400'. A third inner diameter portion 215' is arranged following the second inner diameter portion 225'. A sleeve retaining means 250 is arranged in a circumferential groove 135, similar to the first embodiment, cooperating with the third inner diameter portion and an end stop 230, arranged at the end of the body which is opposite to the first inner diameter portion 205', so that the sleeve retaining means 250 allows the sleeve 200'" to slide between two end positions. The third inner diameter portion 215' has an inner diameter slightly larger than the outside dimension of the sleeve retaining means in assembled state. The torque transfer means 600' are arranged to reciprocally slide in the channels 140, one torque transfer means in each channel. The torque transfer means are preferably substantially spherical balls also for this embodiment. An annular recess 608 is arranged in the first inner diameter portion 205' of the sleeve 200'", to axially hold the torque transfer means 600' relative to the sleeve. The channels 140 preferably have an outer portion 143 where the width of the channel is equal to only the first width 141, on all levels of the channel. The reason for this being that the torque transfer means 600' will have to be assembled into the channels 140 and into the annular recess 608 in one simultaneous operation, and without the wide outer portion 143 of the channels 140 this would be mechanically impossible. The end stop 230 is preferably bevelled on the side of the sleeve 200'", which faces away from the third inner diameter portion 215', to facilitate sliding of the sleeve over the sleeve retaining means 250 during the assembly of the sleeve onto the body.

In FIGS. 19A to 21B, a fourth embodiment of the invention is shown. This embodiment is practically identical to the third embodiment, but the annular recess 608' is formed in a separate holder ring 609. The sleeve 200'" has three inner diameter portions, with steps between the individual portions, as in the second and third embodiments, but the first inner diameter portion 205" is shorter in longitudinal length and the second inner diameter portion 225" is correspondingly longer in longitudinal length, compared to the mentioned embodiments. The difference in length corresponds to the width of the holder ring 609, which is preferably press fit in the second inner diameter portion and pressed against the step formed by the first inner diameter portion. The outer diameter of the holder ring is thus slightly smaller than the inner diameter of the second inner diameter portion 225". The dust cap described for the second embodiment of the invention is useful also for the fourth embodiment.

In FIGS. 22A to 29, a fifth embodiment of the invention is shown, which provides an adjustable depth setting for how deep the screw is driven before the torque transfer is disengage by the device. The Figs. show an arrangement coupled to the torque transfer disengagement mechanism according to the first embodiment of the invention, but any of the other embodiments (second, third or fourth) are equally suitable to provide the torque transfer disengagement mechanism for the adjustable depth setting which will now be described.

A sleeve 700, with particulars corresponding to any of the first, second, third or fourth embodiment sleeves described above, further has a guide means cavity 705, which is open to the inside of the sleeve but closed to te outside of the sleeve. A guide means 900 is arranged to reciprocate in the guide means cavity, whilst being biased towards the inside of the sleeve by a guide means biasing means 710. The guide means is preferably a ball with a diameter slightly smaller than the diameter of the guide means cavity 705, and the guide means biasing means is preferably a screw spring adapted to fit inside the guide means cavity. The body 110", with particulars corresponding to any of the first, second, third or fourth embodiment bodies described above, further comprises an inclined main furrow 800 arranged on the outer surface of the body and in a sleeve sliding area of this surface. Extending axially from the main furrow, and parallel to the longitudinal axis of the elongate body 110", are a plurality of screw driving depth defining furrows, preferably a first axial furrow 811, a second axial furrow 812, a third axial furrow 813, a fourth axial furrow 814 and a fifth axial furrow 815. Each axial furrow has a certain axial length along the longitudinal axis of the body. This length and the position of the individual axial furrow along the inclined main furrow, together with the sleeve stroke defined by the first and second end positions of the sleeve as determined by the sleeve retaining means 250, defines the screw driving depth at which the mechanism disengages torque transfer, as will be described below. The guide means cavity 705 thus cooperates with the guide means 900, which is slidingly arranged in the main furrow 800 and held by the guide means cavity of the sleeve 700, so that the sleeve is turnable relative the body following the path defined by the main furrow and the axial furrows, with click-in stops for the guide means provided by a plurality of indentations arranged in the main furrow, aligned with each of the axial furrows. The plurality of indentations preferably comprise a first indentation 801, a second indentation 802, a third indentation 803, a fourth indentation 804 and a fifth indentation 805.

Figure 24:
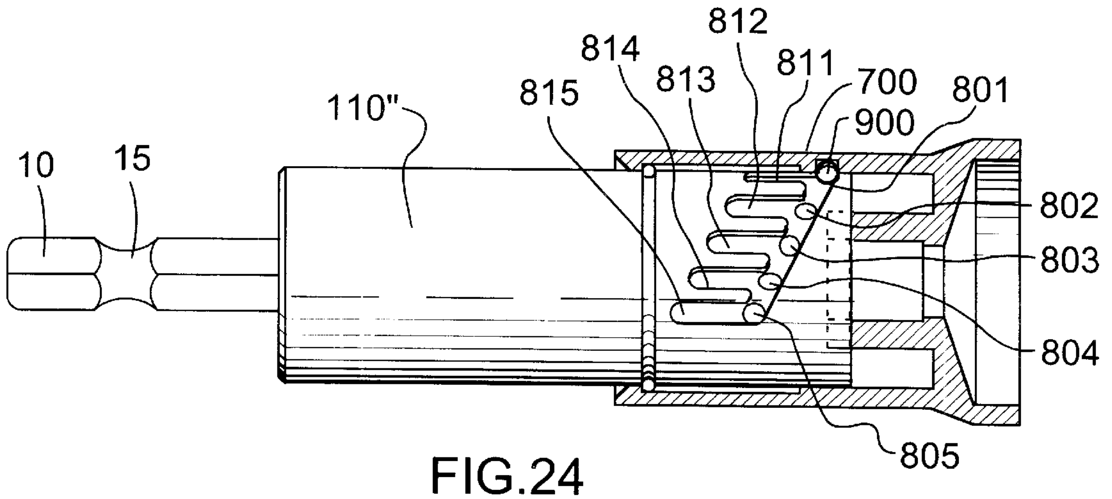
FIG. 24 is a partially sectioned side view of a device according to the fifth embodiment of the invention.
Figure 25A:
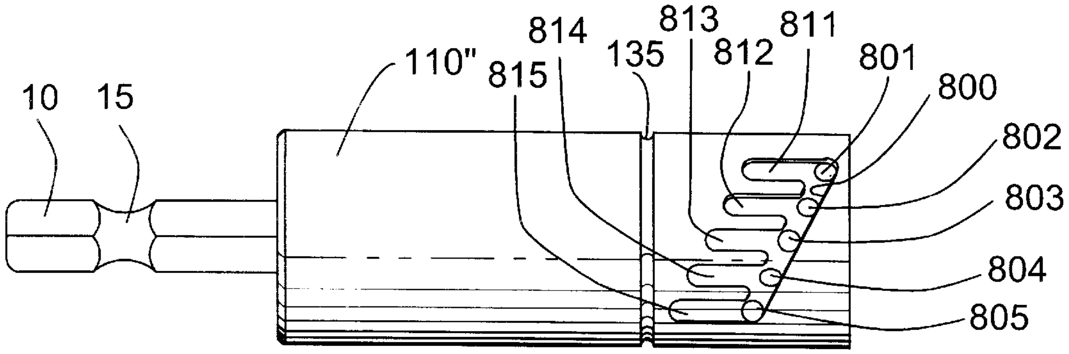
FIG. 25A is a side view of an elongate body according to the fifth embodiment of the invention.
Figure 25B:
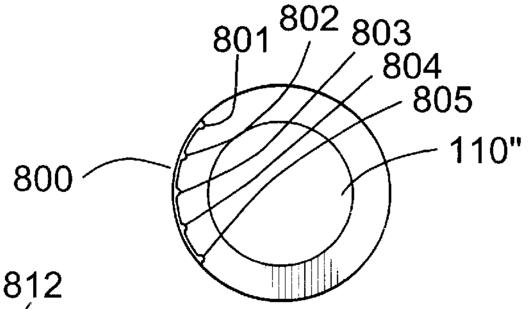
FIG. 25B is a frontal view of an elongate body according to the fifth embodiment of the invention, seen from the tool bit side of the assembled device.
Figure 25C:
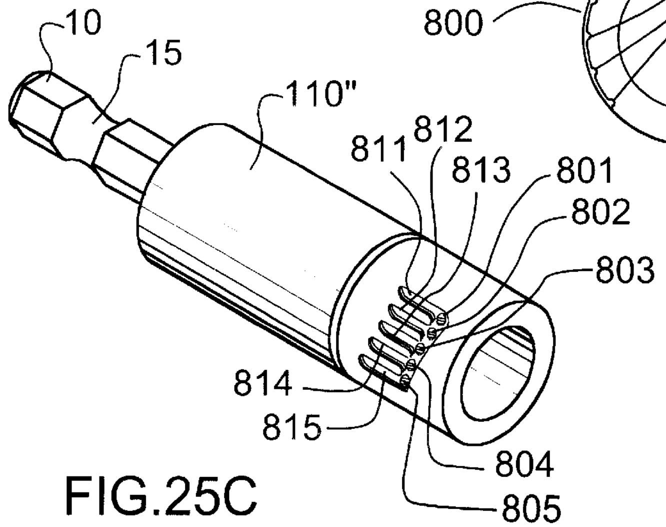
FIG. 25C is a perspective view of an elongate body according to the fifth embodiment of the invention, seen from the tool bit side of the assembled device.
Figure 26A:
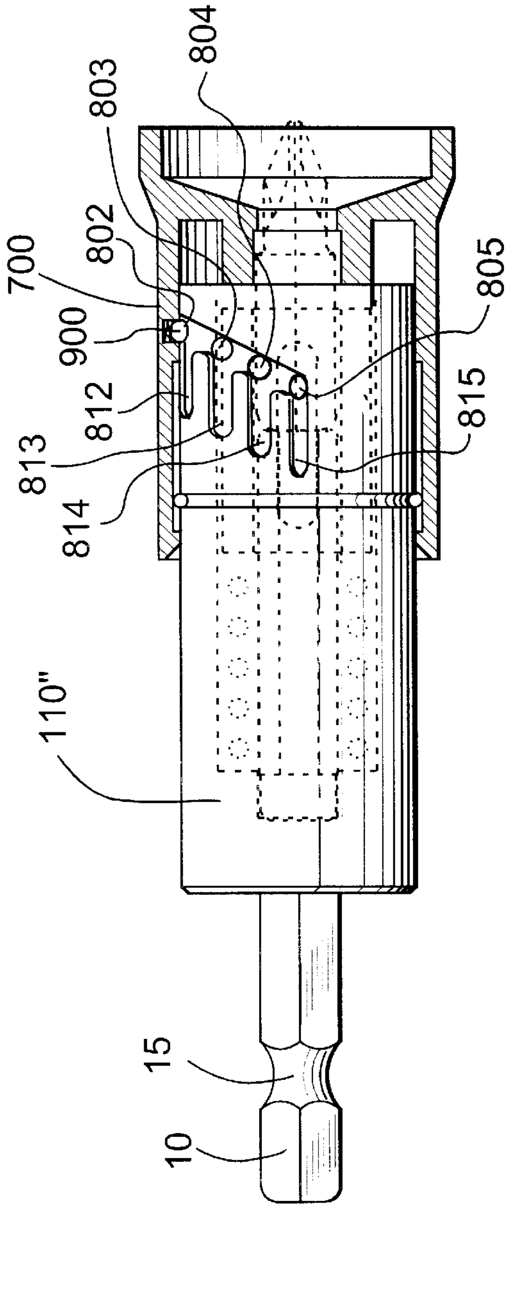
FIG. 26A is a sectional side view of a device according to the fifth embodiment of the invention, showing the sleeve in a second driving depth setting.
Figure 26B:
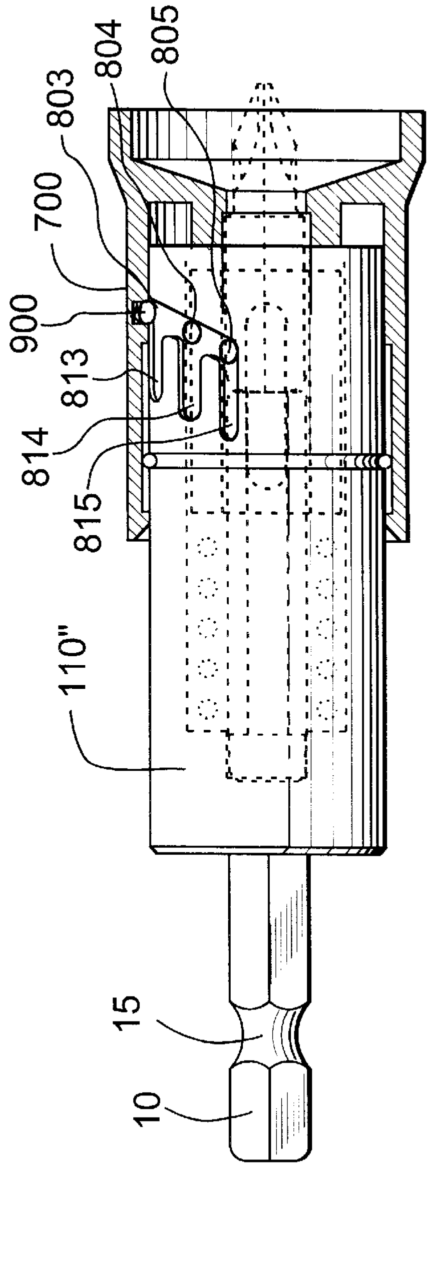
FIG. 26B is a sectional side view of a device according to the fifth embodiment of the invention, showing the sleeve in a third driving depth setting.
Figure 26C:
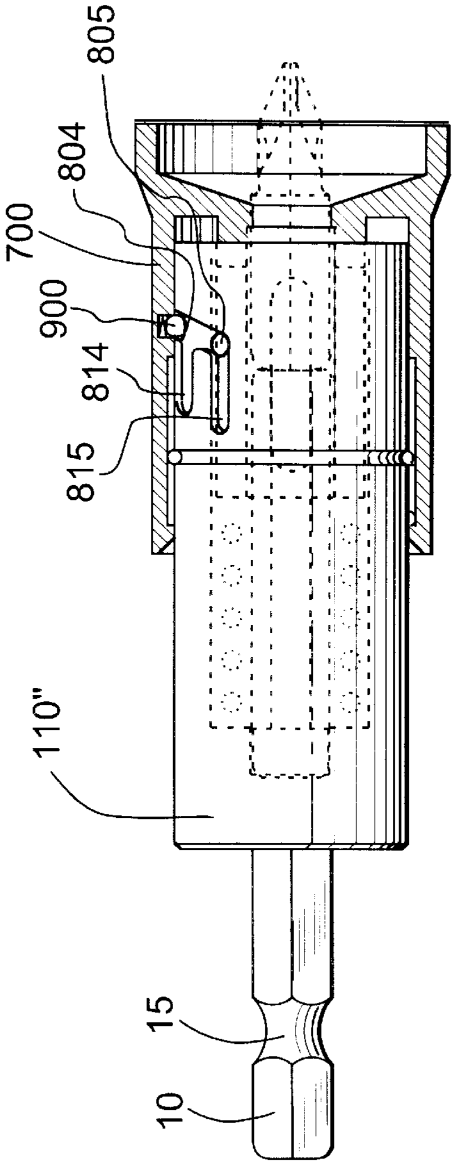
FIG. 26C is a sectional side view of a device according to the fifth embodiment of the invention, showing the sleeve in a fourth driving depth setting.
Figure 26D:
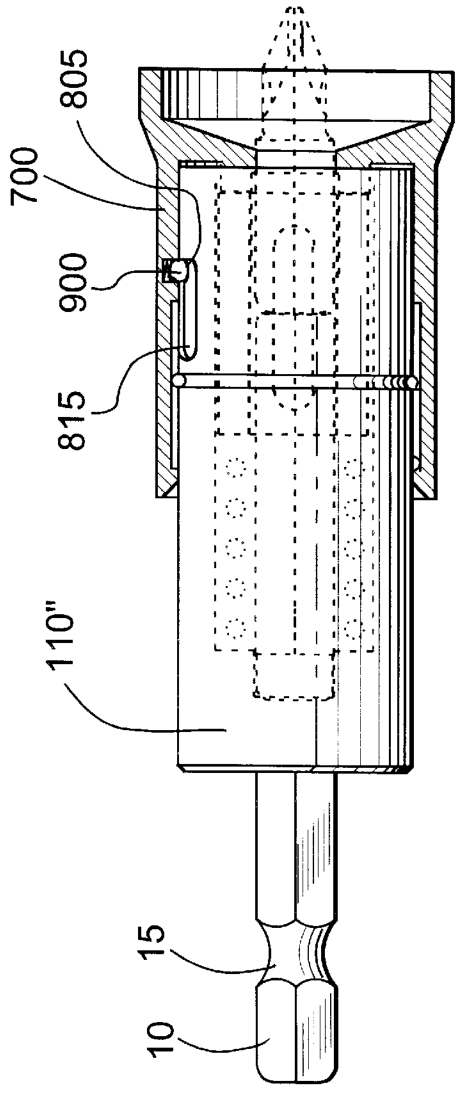
FIG. 26D is a sectional side view of a device according to the fifth embodiment of the invention, showing the sleeve in a fifth driving depth setting.

The relative position of the sleeve 700 and the body may thus be selected by turning the sleeve so that the guide means 900 clicks into any of the axial furrow aligned plurality of indentations 801, 802, 803, 804, 805. The length between the front part 202 of the sleeve and a working portion of the tool bit (the tip of the tool bit) determines the screw driving depth at which the mechanism disengages the torque transfer from the torque input shaft 10 to the tool bit 300. FIG. 24 shows the device where the sleeve 700 is in a first position having the longest throw of sleeve travel before the torque transfer is interrupted. FIG. 26A shows the device where the sleeve 700 is in a second position having a shorter throw of sleeve travel before the torque transfer is interrupted, compared to FIG. 24. FIG. 26B, in turn, shows the device where the sleeve 700 is in a third position having a shorter throw of sleeve travel before the torque transfer is interrupted, compared to FIG. 26A. FIG. 26C shows the device where the sleeve 700 is in a fourth position having a shorter throw of sleeve travel before the torque transfer is interrupted, compared to FIG. 26B. FIG. 26D, finally, shows the device where the sleeve 700 is in a fifth position having a shorter throw of sleeve travel before the torque transfer is interrupted, compared to FIG. 26C.

Figure 27:
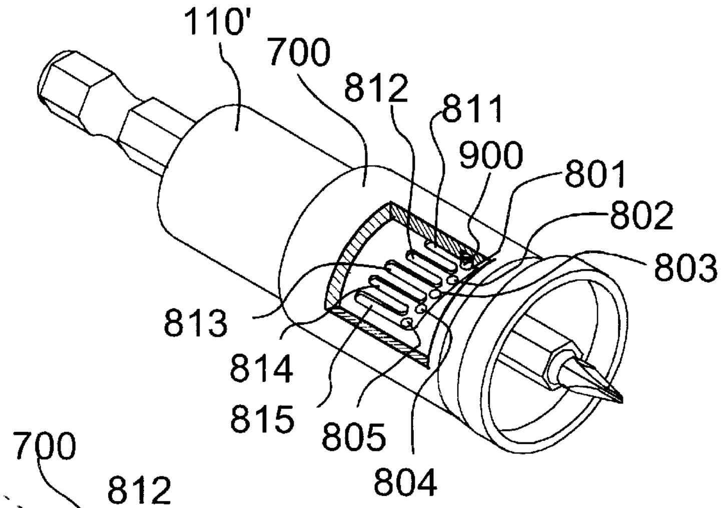
FIG. 27 is a partially sectioned perspective view of a device according to the fifth embodiment of the invention, seen from the tool bit side.
Figure 28:
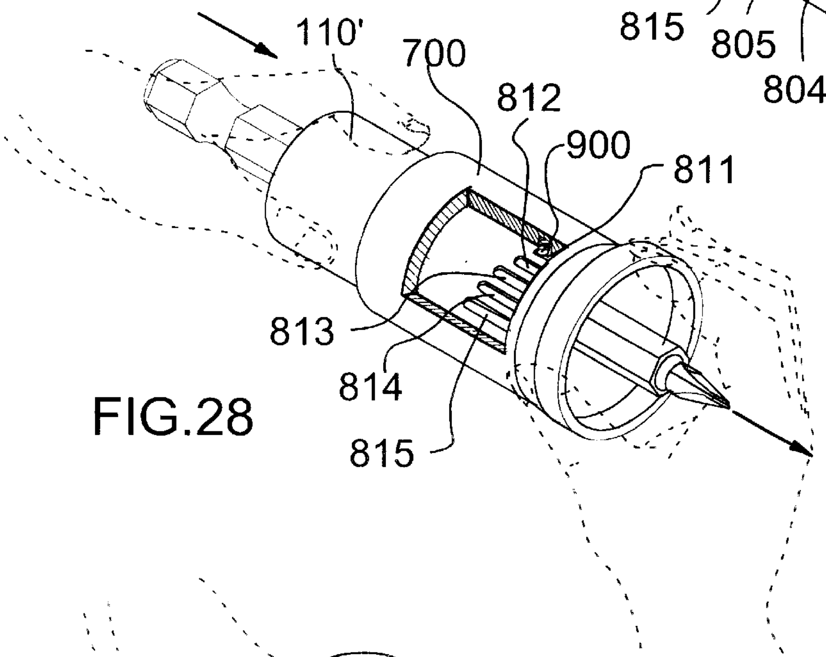
FIG. 28 is a partially sectioned perspective view of a device according to the fifth embodiment of the invention, seen from the tool bit side, showing the device with the sleeve in its fully pressed-in position relative the elongate body.
Figure 29:
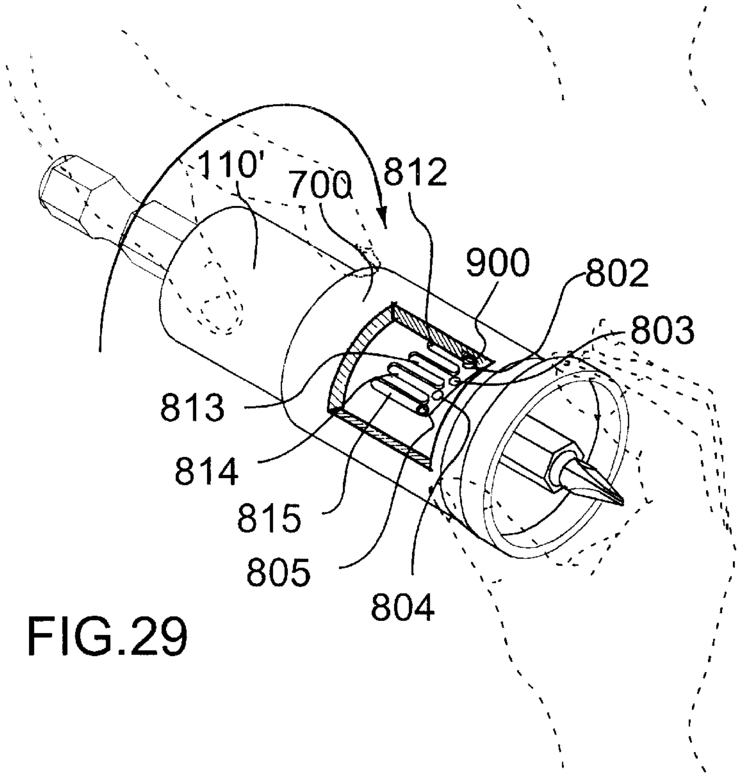
FIG. 29 is a partially sectioned perspective view of a device according to the fifth embodiment of the invention, seen from the tool bit side, showing the twisting of the sleeve to set a different driving depth release point.
Figure 31:
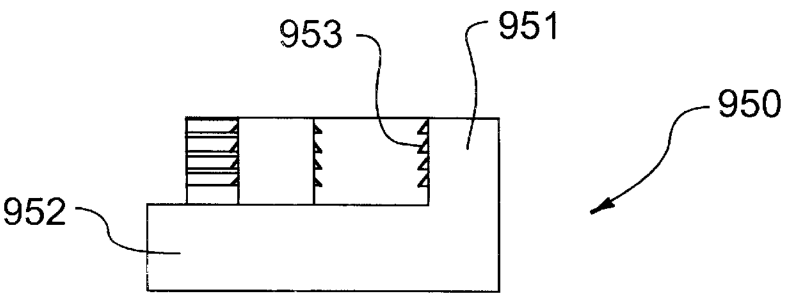
FIG. 31 is a side view of the dust cover of FIG. 30.
Figure 30:
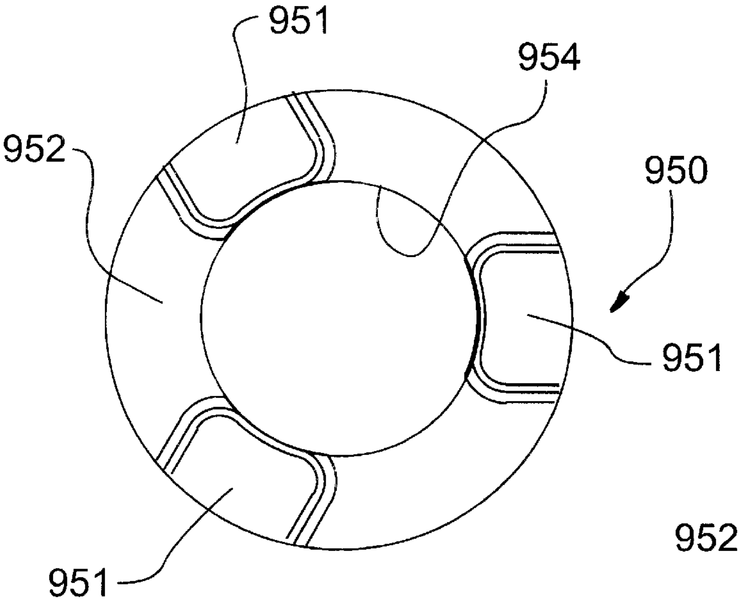
FIG. 30 is a top view of a dust cover according to the third and fourth embodiments of the invention.
Figure 32:
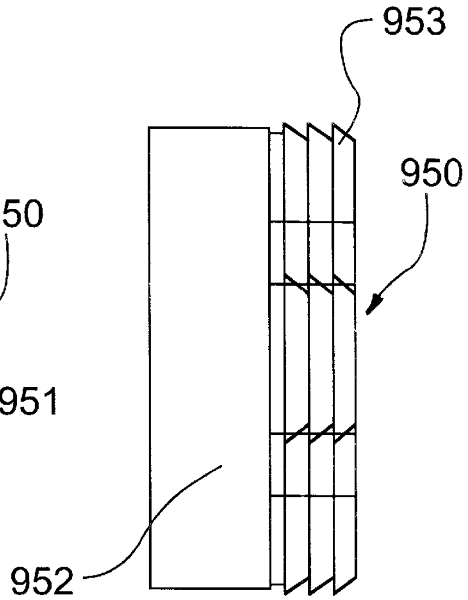
FIG. 32 is a further side view of the dust cover of FIG. 30.

FIGS. 27 to 29 show the device according to the fifth embodiment of the invention in a perspective with the sleeve 700 cut to reveal the underlying system of guidance furrows for the guide means 900. FIG. 28 shows a pair of user's hands manipulating the device to compress the second biasing means 500 by pressing the sleeve 700 towards the torque input shaft 10, illustrating what happens when the front portion 202' of the sleeve makes contact with a working surface into which a screw is driven. FIG. 29 illustrates a user's hands manipulating the device to change the preset depth of torque release, as described above.

The device according to any of the described embodiments of the invention adds safety to the use of the device, because the sleeve may be extended to laterally stabilize a screw, or the like, during driving of the screw into a workpiece. In this way, the device prevents the screw from collapsing sideways during higher torque applications.

It will be appreciated that the above description relates to the preferred embodiments by way of example only. Many variations on the invention will be obvious to those knowledgeable in the field, and such obvious variations are within the scope of the invention as described and claimed, whether or not expressly described.

What is claimed as the invention is:

1. A device for holding a tool bit and selectively transmitting or releasing torque between a torque generating means and the tool bit, the device comprising:

an elongate body having a tool bit holding means at one end and a torque input shaft at the other end, the torque input shaft shaped to be accepted by a drive means of the torque generating means whereby the body rotates about a longitudinal axis with rotation of the drive means of the torque generating means;

a sleeve surrounding the tool bit holding means end of the body, the sleeve biased away from the torque input shaft end of the body by a biasing means and the sleeve slidably arranged between a first end position and a second end position, a sleeve retaining means to prevent the sleeve from sliding past the first end position and the second end position, wherein the drive means comprises a substantially tubular housing, having a plurality of longitudinal slits and one torque transfer means arranged in each slit, the torque transfer means being shiftable from a position where torque is transferable from the torque transfer means to the tool bit to a position where torque transfer is not transferable from the torque transfer means to the tool bit by sliding the sleeve from the first position, in which the sleeve is biased away from the torque input shaft and the torque transfer means are located adjacent and gripping the tool bit, to the second position, where the sleeve is slid away from the tool bit and the torque transfer means are axially slid away from the tool bit to no longer grip the tool bit.

2. A device as recited in claim 1, comprising means for adjusting a depth setting for how deep a screw is driven before torque transfer is disengaged.

3. A device as recited in claim 1, wherein the torque transfer means comprise substantially cylindrical rods.

4. A device as recited in claim 1, wherein the torque transfer means comprise substantially spherical balls.

5. A device as recited in claim 1, further comprising a dust cap inserted into said slits across a distal end of said tubular housing.

* * * * *